United States Patent
Kuribayashi et al.

(10) Patent No.: US 9,728,797 B2
(45) Date of Patent: Aug. 8, 2017

(54) FUEL CELL AND FUEL CELL STACK

(71) Applicant: NGK SPARK PLUG CO., LTD., Nagoya-shi, Aichi (JP)

(72) Inventors: Makoto Kuribayashi, Ichinomiya (JP); Hayato Katsuda, Komaki (JP); Etsuya Ikeda, Kasugai (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 0 days.

(21) Appl. No.: 14/917,670

(22) PCT Filed: Sep. 8, 2014

(86) PCT No.: PCT/JP2014/004603
§ 371 (c)(1),
(2) Date: Mar. 9, 2016

(87) PCT Pub. No.: WO2015/037217
PCT Pub. Date: Mar. 19, 2015

(65) Prior Publication Data
US 2016/0226085 A1    Aug. 4, 2016

(30) Foreign Application Priority Data

Sep. 10, 2013 (JP) ................................ 2013-187277

(51) Int. Cl.
*H01M 8/04082* (2016.01)
*H01M 8/2425* (2016.01)
(Continued)

(52) U.S. Cl.
CPC ..... *H01M 8/04201* (2013.01); *H01M 8/0252* (2013.01); *H01M 8/0282* (2013.01);
(Continued)

(58) Field of Classification Search
CPC ........... H01M 8/04201; H01M 8/2425; H01M 8/243; H01M 8/0252; H01M 8/04089;
(Continued)

(56) References Cited

U.S. PATENT DOCUMENTS

2013/0130144 A1    5/2013    Todo et al.
2014/0057192 A1    2/2014    Ohno et al.

FOREIGN PATENT DOCUMENTS

CN    2845188 Y    12/2006
CN    102906920 A    1/2013
(Continued)

OTHER PUBLICATIONS

International Search Report issued on Nov. 11, 2014 by the International Searching Authority in PCT/JP2014/004603, (PCT/ISA/210).
(Continued)

*Primary Examiner* — Jane Rhee
(74) *Attorney, Agent, or Firm* — Sughrue Mion, PLLC (57) ABSTRACT

A fuel battery and a fuel cell stack, the fuel battery including: a fuel cell that generates electric power through a power generating reaction of reactant gases and includes a solid electrolyte layer having a first main surface and a second main surface, a first electrode disposed on the first main surface and serving as one of a cathode and an anode, and a second electrode disposed on the second main surface and serving as the other one of the cathode and the anode; an interconnector disposed so as to face the first electrode; and a current collecting member that electrically connects the first electrode to the interconnector. The first electrode includes: an inner portion connected to the current collecting member; and an outer portion disposed outward of the current collecting member and having a height larger than the height of the inner portion.

9 Claims, 8 Drawing Sheets (51) Int. Cl.
    *H01M 8/243*     (2016.01)
    *H01M 8/0252*     (2016.01)
    *H01M 8/04089*     (2016.01)
    *H01M 8/0282*     (2016.01)
    *H01M 8/2475*     (2016.01)
    *H01M 8/124*     (2016.01)

(52) U.S. Cl.
    CPC ....... *H01M 8/04089* (2013.01); *H01M 8/243* (2013.01); *H01M 8/2425* (2013.01); *H01M 8/2475* (2013.01); *H01M 2008/1293* (2013.01)

(58) Field of Classification Search
    CPC ............. H01M 8/0282; H01M 8/2475; H01M 2008/1293
    See application file for complete search history.

(56) References Cited

FOREIGN PATENT DOCUMENTS

| | | |
|---|---|---|
| JP | 61-288376 A | 12/1986 |
| JP | 4-115462 A | 4/1992 |
| JP | 6-310155 A | 11/1994 |
| JP | 2004-319286 A | 11/2004 |
| JP | 2009-245897 A | 10/2009 |
| JP | 2010-21038 A | 1/2010 |
| JP | 2010-73563 A | 4/2010 |
| JP | 2010-165629 A | 7/2010 |
| JP | 2014-67483 A | 4/2014 |
| WO | 2012/144119 A1 | 10/2012 |

OTHER PUBLICATIONS

Office Action dated Mar. 28, 2017 by the State Intellectual Property Office of P.R. China in counterpart Chinese Patent Application No. 201480049878.2.

FUEL CELL AND FUEL CELL STACK

CROSS REFERENCE TO RELATED APPLICATIONS

This application is a National Stage of International Application No. PCT/JP2014/004603 filed Sep. 8, 2014, claiming priority based on Japanese Patent Application No. 2013-187277, filed Sep. 10, 2013, the contents of all of which are incorporated herein by reference in their entirety.

TECHNICAL FIELD

The present invention relates to a fuel battery and to a fuel cell stack.

BACKGROUND ART

Solid oxide fuel cell (hereinafter may be abbreviated as "SOFC") stacks that use a solid oxide as an electrolyte have become known. An SOFC stack includes fuel cells each including, for example, an anode and a cathode disposed on the surfaces of a plate-shaped solid electrolyte layer. A reactant gas (a fuel gas (e.g., hydrogen)) is supplied to the negative electrode (the anode), and another reactant gas (an oxidant gas (e.g., oxygen in air)) is supplied to the positive electrode (the cathode). A chemical reaction occurs through the solid electrolyte layer, whereby electric power is generated (see Patent Document 2). A current collecting member is electrically connected to the anode or the cathode. To isolate the fuel gas from the oxidant gas, the fuel cell is joined to a separator, to thereby provide a separator-attached fuel cell. One or at least two fuel batteries each including a fuel cell and a current collecting member are successively disposed to form a stack (fuel cellstack),

PRIOR ART DOCUMENT

Patent Document

Patent Document 1: Japanese Patent Application Laid-Open (kokai) No. 2010-165629

SUMMARY OF THE INVENTION

Problems to be Solved by the Invention

The reactant gases may contain poisoning substances, such as Cr, Si, B, and S, which cause a reduction in the function of a fuel cell. When the poisoning substances reach an electrode (the cathode or anode), the poisoning substances inhibit the reaction of the reactant gases at the electrode, causing a reduction in the output of the fuel cell. In this case, generally, a filter made of, for example, activated carbon is disposed in an upstream portion of the flow of each reactant gas to trap (adsorb) the poisoning substances in the reactant gas, and the poisoning substances are thereby prevented from reaching the electrode.

However, the poisoning substances may be scattered in the interior of the SOFC stack (e.g., a sealing material or tubing) and incorporated into the reactant gases. In this case, it is difficult to effectively trap (remove) the poisoning substances scattered in the interior of the SOFC stack. Particularly, since the fuel cell is joined to the separator at a position near the fuel cell, it is difficult to effectively remove the poisoning substances scattering from this position.

It is an object of the present invention to provide a fuel battery in which a reduction in performance due to poisoning substances is suppressed.

Means for Solving the Problems (1) The fuel battery according to a first mode comprises
a fuel cell including a solid electrolyte layer having a first main surface and a second main surface, a first electrode disposed on the first main surface and serving as one of a cathode and an anode, and a second electrode disposed on the second main surface and serving as the other one of the cathode and the anode, the fuel cell generating electric power through a power generating reaction of reactant gases;
an interconnector disposed so as to face the first electrode; and
a current collecting member that electrically connects the first electrode to the interconnector;
and the fuel battery is characterized in that
the first electrode includes
an inner portion connected to the current collecting member and
an outer portion disposed outward of the current collecting member and having a height larger than the height of the inner portion.

The reactant gases may contain poisoning substances (Cr, Si, B, S, etc.) that impairs the characteristics of the first electrode. Since the first electrode has the outer portion having a height larger than the height of the inner portion, the outer portion traps the poisoning substances, and poisoning of the inner portion is thereby suppressed. Therefore, deterioration of the characteristics of the first electrode is suppressed, and the characteristics of the fuel battery can be ensured for a long time.

The current collecting member is a conductive member connected to the first electrode.

(2) The fuel battery may further contain
a metallic separator joined to the fuel cell and having an opening through which the first electrode is exposed; and
a sealing portion that contains glass and seals an interface between the opening and the fuel cell.

To seal the fuel cell and the separator, the sealing portion containing glass (amorphous glass, crystallized glass, etc.) is disposed on the surface of a joint portion between the fuel cell and the separator. The glass may contain poisoning substances such as Si and B, and the poisoning substances may impair the characteristics of the first electrode. Even in such a case, since the first electrode has the outer portion having a height larger than the height of the inner portion, the poisoning substances are trapped by the outer portion, and poisoning of the inner portion is thereby suppressed.

The portion of the fuel cell that is joined to the separator is (a) the solid electrolyte layer or (b) the first electrode. When the first electrode is not present on part (e.g., near the outer circumference) of the first main surface of the solid electrolyte layer, the separator can be joined to the solid electrolyte layer.

(3) The distance between the sealing portion and the outer portion is preferably 0.2 mm or more and 3 mm or less.

When the distance between the sealing portion and the outer portion is less than 0.2 mm, the sealing portion may come into contact with the first electrode. In this case, capillarity may cause the sealing portion to permeate into the first electrode, and this may promote poisoning.

When the distance between the sealing portion and the outer portion exceeds 3 mm, the poisoning substances scattered from the sealing portion may easily diffuse around, so that the trapping effect may deteriorate.

(4) The distance between the outer portion and the interconnector disposed so as to face the first electrode is preferably 0.2 mm or more.

When the distance between the outer portion and the interconnector is less than 0.2 mm, the flow of a reactant gas is impeded, and this may impair the output characteristics of the fuel battery.

(5) The outer portion may be disposed at least on a reactant gas inflow side of the first electrode to which one of the reactant gases is supplied.

At least poisoning from the reactant gas inflow side can be effectively suppressed.

The reactant gas inflow side is an upstream side on which a gas supply port for supplying a fuel gas or an oxidant gas is present.

(6) The outer portion may be disposed only on a reactant gas inflow side of the first electrode to which one of the reactant gases is supplied.

In this case, poisoning from the reactant gas inflow side can be effectively suppressed.

(7) The outer portion may be disposed over the entire circumference of the inner portion.

In this case, poisoning from all directions around the inner portion can be suppressed.

(8) The fuel battery may further comprises
a second current collecting member electrically connected to the second electrode, wherein
the second electrode may include
a second inner portion connected to the second current collecting member and
a second outer portion disposed outward of the second current collecting member and having a height larger than the height of the second inner portion.

Since the second electrode has the outer portion having a height larger than the height of the inner portion, deterioration of the characteristics of the second electrode is suppressed, and the characteristics of the fuel battery can be ensured for a long time.

(9) The first electrode may be a cathode.

In this case, deterioration of the characteristics of the fuel battery due to poisoning of the cathode can be suppressed.

(10) Preferably, the height of the outer portion is 10 μm or more and 200 μm or less.

When the height of the outer portion is 10 μm or more, poisoning of the inner portion can be suppressed. When the height of the outer portion is 200 μm or less, deterioration of the output characteristics of the fuel battery due to a reduction in the flow of the reactant gas can be suppressed.

(11) Preferably, the width of the outer portion is 0.5 mm or more and 3 mm or less.

When the width of the outer portion is 0.5 mm or more, poisoning of the inner portion can be suppressed. When the width of the outer portion is 3 mm or less, the area of the inner portion that contributes to power generation can be ensured sufficiently.

(12) A fuel cell stack is characterized by comprising one or at least two fuel batteries as recited in (1) to (11) above.

Effects of the Invention

The present invention can provide a fuel battery and a fuel cell stack in which a reduction in performance due to poisoning substances is suppressed.

MODES FOR CARRYING OUT THE INVENTION

The solid oxide fuel cell stack according to the present invention will next be described with reference to the drawings.

First Embodiment

Figure 1:
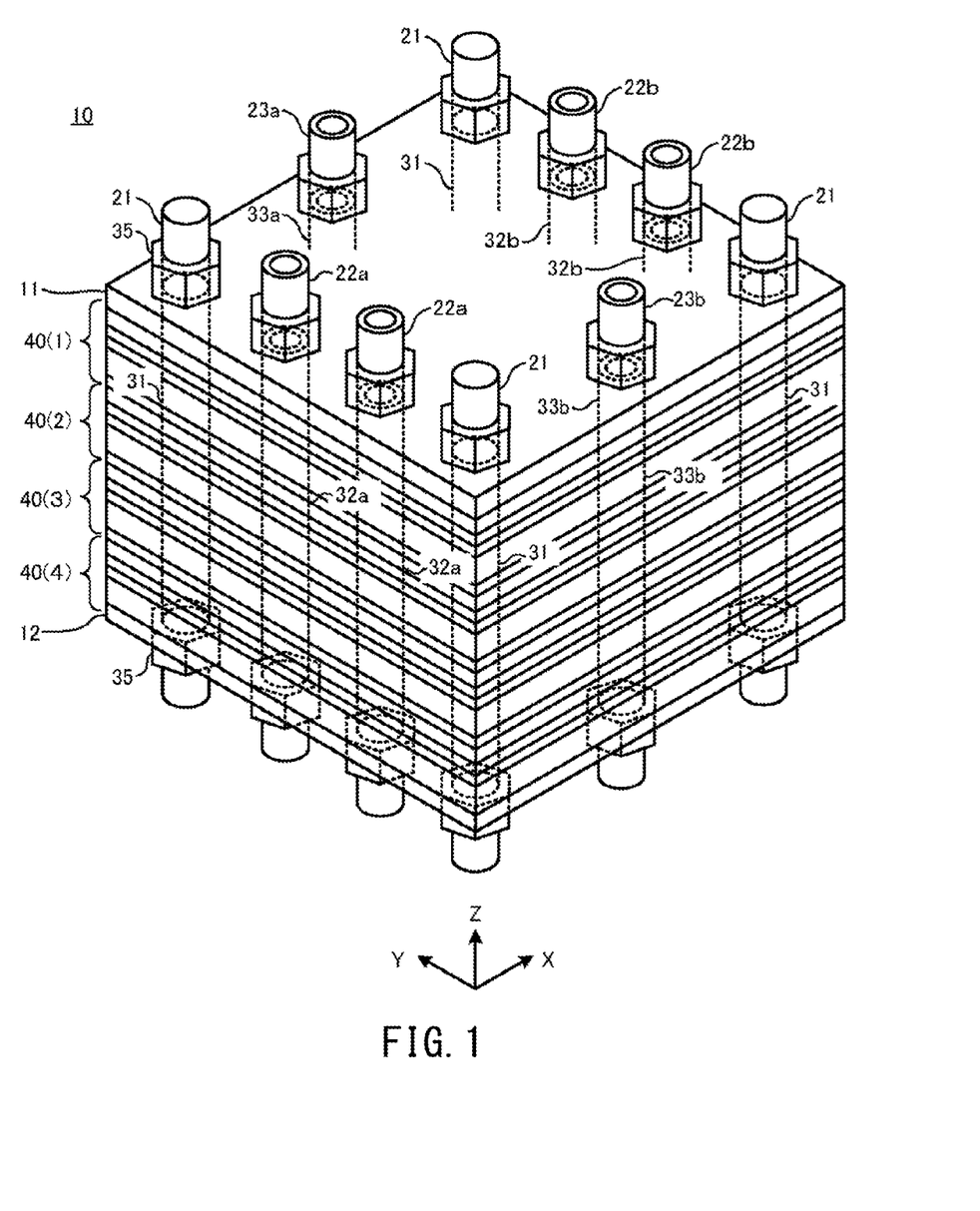
FIG. 1 Perspective view showing a solid oxide fuel cell stack 10.

FIG. 1 is a perspective view showing a solid oxide fuel cell stack 10 according to a first embodiment of the present invention. The solid oxide fuel cell stack 10 generates electric power through supply of reactant gases (a fuel gas (e.g., hydrogen) and an oxidant gas (e.g., air (specifically, oxygen in air))).

The reactant gases, particularly the oxidant gas (air), may contain poisoning substances such as Cr, Si, B, and S because, for example, these poisoning substances scattered in the interior of the SOFC stack (e.g., a sealing material or tubing) may be incorporated into the reactant gases.

The solid oxide fuel cell stack 10 includes end plates 11 and 12 and fuel cells 40(1) to 40(4) that are stacked and fixed together by bolts 21, 22 (22a, 22b), and 23 (23a, 23b) and nuts 35.

Figure 2:
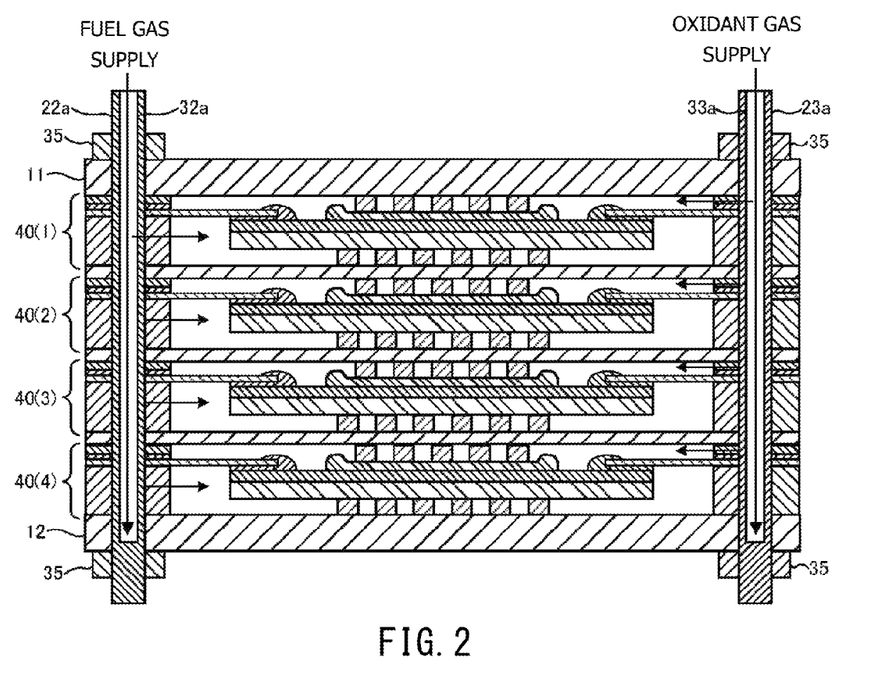
FIG. 2 Schematic cross-sectional view of the solid oxide fuel cell stack 10.

FIG. 2 is a schematic cross-sectional view of the solid oxide fuel cell stack 10.

The solid oxide fuel cell stack 10 is a fuel cell stack including the stacked fuel cells 40(1) to 40(4). For the ease of understanding, the four fuel cells 40(1) to 40(4) are stacked in the present embodiment. However, about 20 to about 60 fuel cells 40 are generally stacked.

The end plates 11 and 12 and the fuel cells 40(1) to 40(4) have through holes 31, 32 (32a, 32b), and 33 (33a, 33b) for the bolts 21, 22 (22a, 22b), and 23 (23a, 23b), respectively. The end plates 11 and 12 are holding plates that press and hold the stacked fuel cells 40(1) to 40(4) and also serve as output terminals for current from the fuel cells 40(1) to 40(4).

Figure 3:
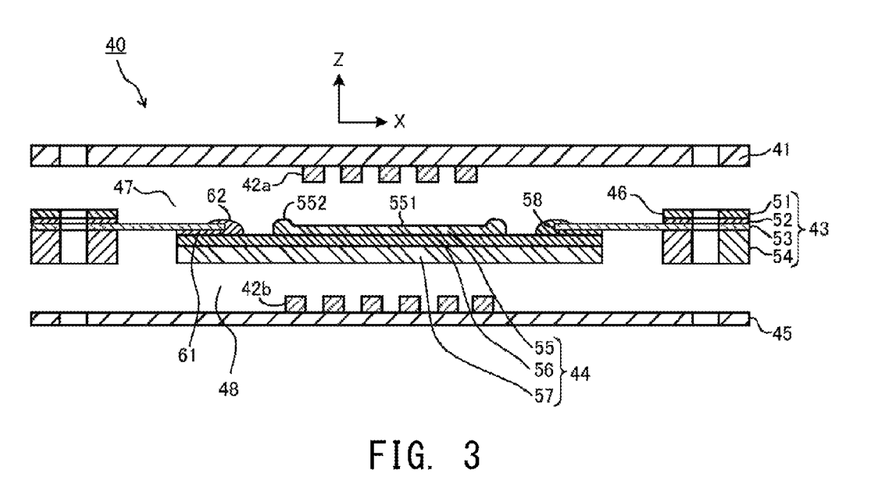
FIG. 3 Exploded cross-sectional view of a fuel cell 40.
Figure 4:
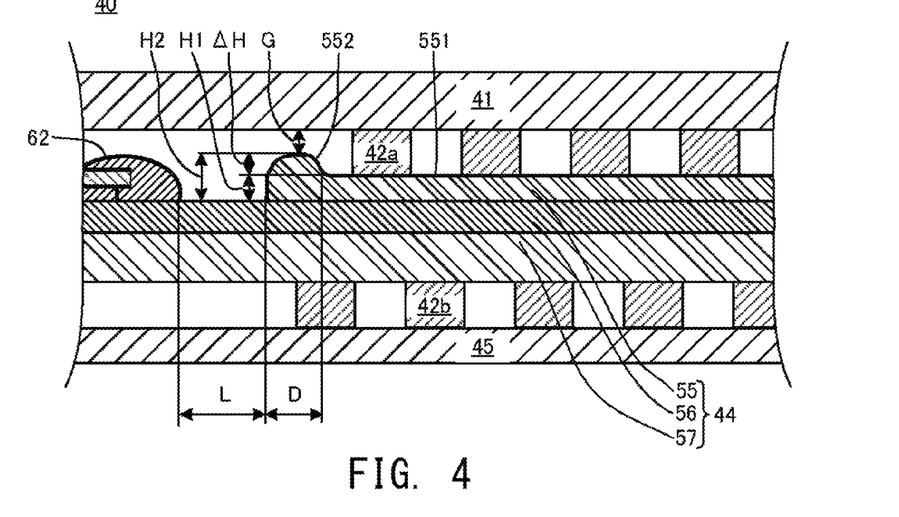
FIG. 4 Partially enlarged cross-sectional view of the fuel cell 40.
Figure 5:
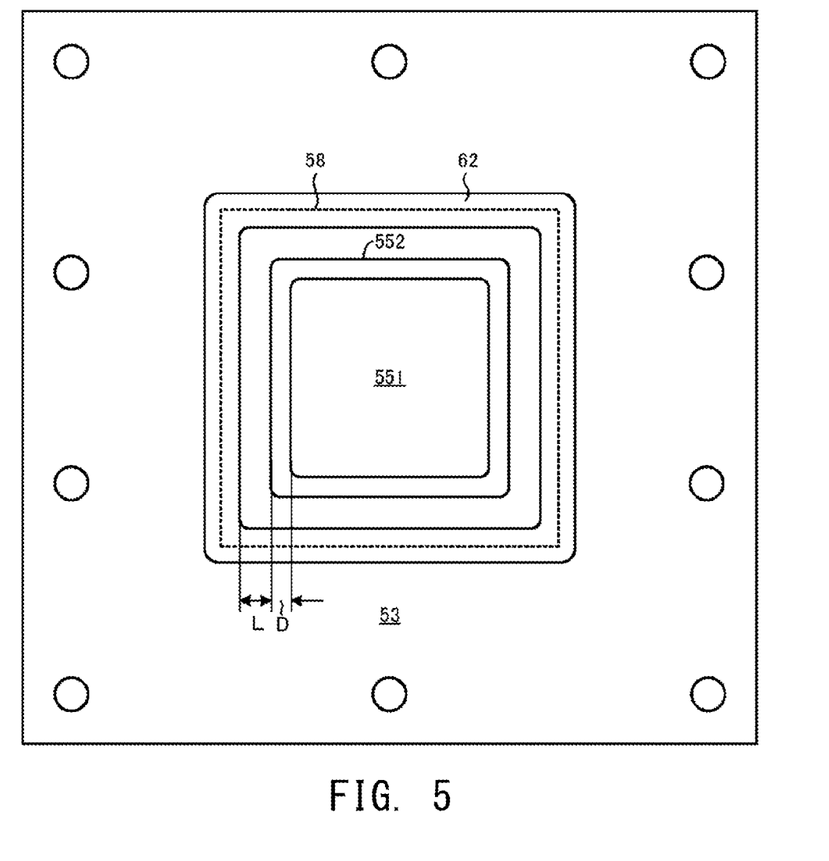
FIG. 5 Top view of a separator-attached fuel cell 50.

FIG. 3 is an exploded cross-sectional view of one of the fuel cells 40. FIG. 4 is a partial enlarged cross-sectional view of the fuel cell 40. FIG. 5 is a top view of a separator-attached fuel cell 50. As shown in FIG. 3, the fuel cell 40 has a metallic separator 53 and a fuel cell main body 44 and includes interconnectors 41 and 45, current collecting members 42a and 42b, and a frame unit 43.

The fuel cell main body (a fuel cell in a narrow sense) 44 is formed by holding a solid electrolyte layer 56 between a cathode (may be referred to also as a cathode layer) 55 and an anode (may be referred to also as an anode layer) 57. The solid electrolyte layer 56 has two main surfaces. These main surfaces face an oxidant gas path 47 and a fuel gas path 48, respectively, and the cathode 55 and the anode 57 are disposed on these main surfaces, respectively.

One of the cathode 55 and the anode 57 serves as a first electrode, and the other one serves as a second electrode.

Perovskite-based oxides (such as LSCF (lanthanum strontium cobalt iron oxide) and LSM (lanthanum strontium manganese oxide)), various noble metals, and cermets of noble metals and ceramic materials may be used for the cathode 55.

Materials such as YSZ (yttria-stabilized zirconia), ScSZ (scandia-stabilized zirconia), SDC (samarium-doped ceria), GDC (gadolinium-doped ceria), and perovskite-based oxides may be used for the solid electrolyte layer 56.

Metals are preferably used for the anode 57, and Ni, Ni-ceramic cermet, and ceramic material, and Ni-based alloy may be used.

Each of the interconnectors 41 and 45 is a plate-shaped conductive member (e.g., made of a metal such as stainless steel) that can ensure electrical continuity between adjacent fuel cell main bodies 44 and prevent gasses in the adjacent fuel cell main bodies 44 from mixing with each other.

Only one interconnector (41 or 45) is disposed between adjacent fuel cell main bodies 44 (because two fuel cell main bodies 44 connected in series share one interconnector). In the uppermost and lowermost fuel cell main bodies 44, the conductive end plates 11 and 12 are disposed instead of the interconnectors 41 and 45, respectively.

The current collecting member 42a is used to ensure electrical continuity between the interconnector 41 and the cathode 55 of the fuel cell main body 44 and includes, for example, protrusions formed on the interconnector 41. The current collecting member 42b is used to ensure electrical continuity between the interconnector 41 and the anode 57 of the fuel cell main body 44. For example, air-permeable nickel felt, nickel mesh, etc. may be used of the current collecting member 42b.

The frame unit 43 has an opening 46 through which the oxidant gas and the fuel gas flow. The opening 46 is hermetically sealed, and the inside thereof is divided into the oxidant gas path 47 through which the oxidant gas flows and the fuel gas path 48 through which the fuel gas flows. The frame unit 43 in the present embodiment includes a cathode frame 51, an insulating frame 52, the metallic separator 53, and an anode frame 54.

The cathode frame 51 is a metallic frame disposed on the cathode 55 side, and the opening 46 is provided in the central portion of the cathode frame 51. The oxidant gas path 47 is defined by the opening 46.

The insulating frame 52 is a frame that electrically insulates the interconnectors 41 and 45 from each other. For example, ceramics such Al$_2$O$_3$, mica, vermiculite, etc., may be used for the insulating frame 52, and the opening 46 is provided in the central portion thereof. The oxidant gas path 47 is defined by the opening 46. Specifically, the insulating frame 52 is disposed between the interconnectors 41 and 45 such that one surface of the insulating frame 52 is in contact with the cathode frame 51 and the other surface is in contact with the metallic separator 53. The insulating frame 52 thereby electrically insulates the interconnectors 41 and 45 from each other.

The metallic separator 53 is a frame-shaped metallic thin plate (for example, thickness: 0.1 mm) having an opening 58. The metallic separator 53 is a metallic frame that is attached to the solid electrolyte layer 56 of the fuel cell main body 44 and prevents mixing of the oxidant gas and the fuel gas. The metallic separator 53 divides the space in the opening 46 of the frame unit 43 into the oxidant gas path 47 and the fuel gas path 48, and mixing of the oxidant gas and the fuel gas is thereby prevented.

The opening 58 formed in the metallic separator 53 is a through hole passing through the upper and lower surfaces of the metallic separator 53, and the cathode 55 of the fuel cell main body 44 is disposed within the opening 58. The fuel cell main body 44 with the metallic separator 53 joined thereto is a separator-attached fuel cell 50.

Similar to the insulating frame 52, the anode frame 54 is an insulating frame disposed on the anode 57 side, and the opening 46 is formed in the central portion of the anode frame 54. The fuel gas path 48 is defined by the opening 46.

The cathode frame 51, the insulating frame 52, the metallic separator 53, and the anode frame 54 have, in their circumferential portions, the through holes 31, 32 (32a, 32b), and 33 (33a, 33b) into which the bolts 21, 22 (22a, 22b), and 23 (23a, 23b) are inserted or through which the oxidant gas or the fuel gas flows.

A joint portion 61 and a sealing portion 62 are disposed between the fuel cell main body 44 and the metallic separator 53, and the separator-attached fuel cell 50 is thereby formed. The lower surface of the metallic separator 53 and the upper surface of the solid electrolyte layer 56 are joined along the opening 58 through the joint portion 61 and sealed by the sealing portion 62.

The joint portion 61 is formed from a brazing material containing Ag and disposed over the entire circumference of the opening 58, and the fuel cell main body 44 and the metallic separator 53 are thereby joined to each other.

The sealing portion 62 is disposed over the entire circumference of the opening 58 and extends inwardly from the joint portion 61 into the opening 58 to thereby seal the gap between the fuel cell main body 44 and the metallic separator 53 (the surface of the joint portion therebetween), in order to prevent mixing of the oxidant gas present inside the opening 58 of the metallic separator 53 and the fuel gas present outside the opening 58. A sealing material containing glass, specifically, a glass (amorphous glass), a glass ceramic (crystallized glass), and a composite of a glass and a ceramic, may be used for the sealing portion 62. The sealing material for the sealing portion 62 may contain poisoning substances such as Si, B, and S.

In the present embodiment, the cathode 55 is not disposed near the outer circumference of the solid electrolyte layer 56. Therefore, the solid electrolyte layer 56 of the fuel cell main body 44 and the metallic separator 53 are joined and sealed through the joint portion 61 and the sealing portion 62.

However, the cathode 55 may be disposed near the outer circumference of the solid electrolyte layer 56. In this case, the cathode 55 of the fuel cell main body 44 and the metallic separator 53 are joined and sealed through the joint portion 61 and the sealing portion 62. In this case, an outermost circumferential portion having a height smaller than the height of an outer portion 552 of the cathode 55 described later is disposed outward of the outer portion 552.

In the present embodiment, the cathode 55 has an inner portion 551 and the outer portion 552. The inner portion 551 has a substantially rectangular shape, is disposed in an inner region of the cathode 55, and connected to (in contact with) the current collecting member 42a. The outer portion 552 has a substantially rectangular shape, is disposed in an outer circumferential region of the cathode 55 (at the outer circumference of the inner portion 551), and is not in contact with the current collecting member 42a.

The oxidant gas flows into the oxidant gas path 47 through the through hole 33a, passes over the cathode 55, and is discharged from the through hole 33b.

The height H2 of the outer portion 552 itself (the height from the main surface of the solid electrolyte layer 56) is larger than the height H1 of the inner portion 551 (H2>H1). Therefore, poisoning substances contained in a reactant gas (the oxidant gas) flowing from an outer circumferential end of the cathode 55 toward its inner region are trapped by the outer portion 552, and poisoning of the inner portion 551 is suppressed. Deterioration of the characteristics of the cathode 55 is thereby suppressed, so that the characteristics of the fuel cell main body 44 can be ensured for a long time.

Even when poisoning substances contained in the sealing portion 62 are scattered and incorporated into a reactant gas (the oxidant gas in this case), the poisoning substances are easily trapped by the outer portion 552, and poisoning of the inner portion 551 is thereby suppressed.

Preferably, the height $\Delta H$ (=H2-H1) of the outer portion 552 with respect to the inner portion 551 is 10 μm or more and 200 μm or less. When the height $\Delta H$ of the outer portion 552 is 10 μm or more, poisoning of the inner portion 551 can be suppressed. When the height $\Delta H$ of the outer portion 552 is 200 μm or less, deterioration of the output characteristic of the fuel cell stack 10 due to a reduction in the flow of the reactant gas can be suppressed.

The width D of the outer portion 552 is preferably 0.5 mm or more and 3 mm or less. When the width D of the outer portion 552 is 0.5 mm or more, poisoning of the inner portion 551 can be suppressed. When the width D of the outer portion 552 is 3 mm or less, the area of the inner portion that contributes to power generation can be ensured sufficiently.

In the present embodiment, the outer portion 552 is disposed over the entire circumference of the cathode 55. Therefore, poisoning from all directions around the inner portion 551 can be suppressed. However, the outer portion 552 may be disposed at least on a reactant gas inflow side of the cathode 55 to which the reactant gas (the oxidant gas) is supplied or may be disposed only on the reactant gas inflow side of the cathode 55 to which the reactant gas (the oxidant gas) is supplied. For example, the outer portion 552 may be disposed on the side toward the through hole 33b so as extend over about half (e.g., 40 to 70%) of the circumference of the cathode 55.

A prescribed distance (distance L) is present between the outer portion 552 and the sealing portion 62. Preferably, the distance L is 0.2 mm or more and 3 mm or less.

When the distance L is less than 0.2 mm, the sealing portion 62 may come into contact with the cathode 55. In this case, capillarity may cause the material of the sealing portion 62 to permeate into the cathode 55, and this may promote poisoning of the inner portion 551.

When the distance L exceeds 3 mm, the poisoning substances scattered from the sealing portion 62 may easily diffuse around, so that the effect of trapping the poisoning substances by the outer portion 552 may be reduced.

A distance (gap) G is present between the outer portion 552 and the interconnector 41. The distance G is preferably 0.2 mm or more. When the distance G is less than 0.2 mm, the flow of the reactant gas (oxidant gas) is impeded. In this case, the amount of the reactant gas that reaches the inner portion 551 becomes small, and this may impair the output characteristics of the fuel cell stack 10 (the fuel cell 40).

Method of Producing Fuel Cell Main Body 44

The inner portion 551 and the cathode 55 having the inner portion 551 (the fuel cell main body 44) can be produced as follows. A sheet serving as the solid electrolyte layer 56 is laminated onto one surface of a green sheet that later becomes the anode 57 to form a laminate, and the laminate is fired. Then, the material of the cathode 55 is printed and fired to produce the fuel cell main body 44. In this case, a liquid material having high viscosity is used as the material of the cathode 55. Since the material printed has high viscosity, the thickness of a region near the outer circumference of the printed area becomes large, and the outer portion 552 can thereby be formed.

Alternatively, the number of printing operations (the number of printed layers) on the outer portion 552 may be larger than that on the inner portion 551. For example, printing is performed on a region containing both the inner portion 551 and the outer portion 552. Then printing is further performed on a region containing only the outer portion 552. In this case, the number of printing operations on the outer portion 552 is larger than that on the inner portion 551, so that the height of the outer portion 552 can be larger than the height of the inner portion 551.

Other Embodiments

Embodiments of the present invention are not limited to the embodiment described above and can be expanded and modified. Such expanded or modified embodiments are also included in the technical scope of the present invention.

In the embodiment described above, only the cathode 55 has the inner portion 551 and the outer portion 552. However, the anode 57 may have an inner portion and an outer portion having a height larger than the height of the inner portion. In this case, the current collecting member 42b that electrically connects the anode 57 to the interconnector 45 is disposed between the inner portion (the anode 57) and the interconnector 45 that face each other.

Each of the cathode 55 and the anode 57 may have an inner portion and an outer portion having a height larger than the inner portion.

The fuel cell stack in the above-described embodiment of the present invention has plate-shaped fuel cells. However, the shape of the fuel cells is not limited to that in the present embodiment and may be any other shape (a circular columnar shape, a flattened elliptic columnar shape, etc.).

In the fuel cell stack in the above-described embodiment of the present invention, one or at least two fuel batteries each including a plate-shaped fuel cell are stacked. However, the shape of the fuel cells is not limited to that in the present embodiment, and one or at least two fuel cells having another shape (a circular columnar shape, a flattened elliptic columnar shape, etc.) may be disposed successively.

Figure 6:
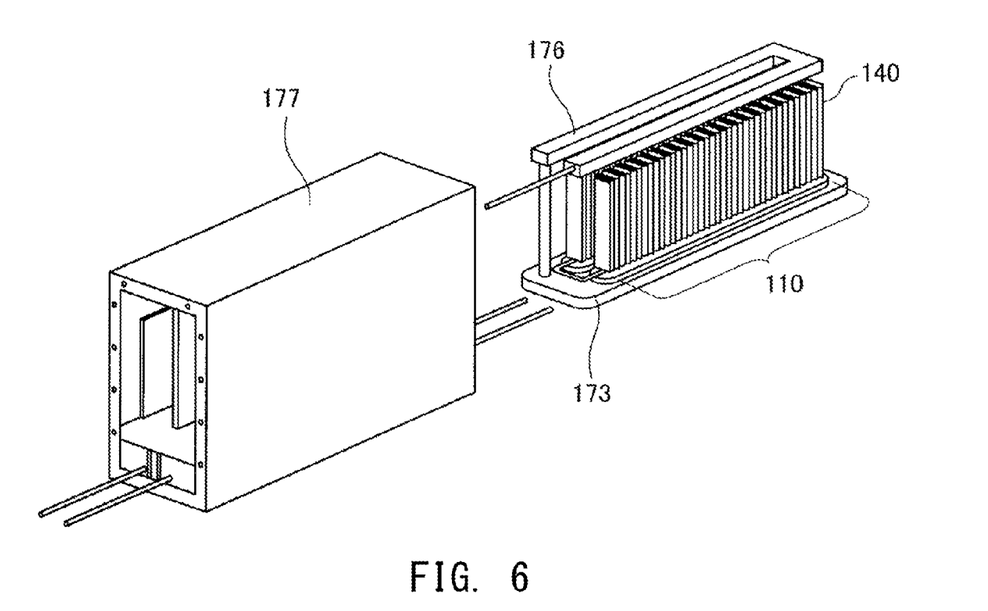
FIG. 6 Schematic view of the configuration a solid oxide fuel cell stack 110 in another or second embodiment.
Figure 7:
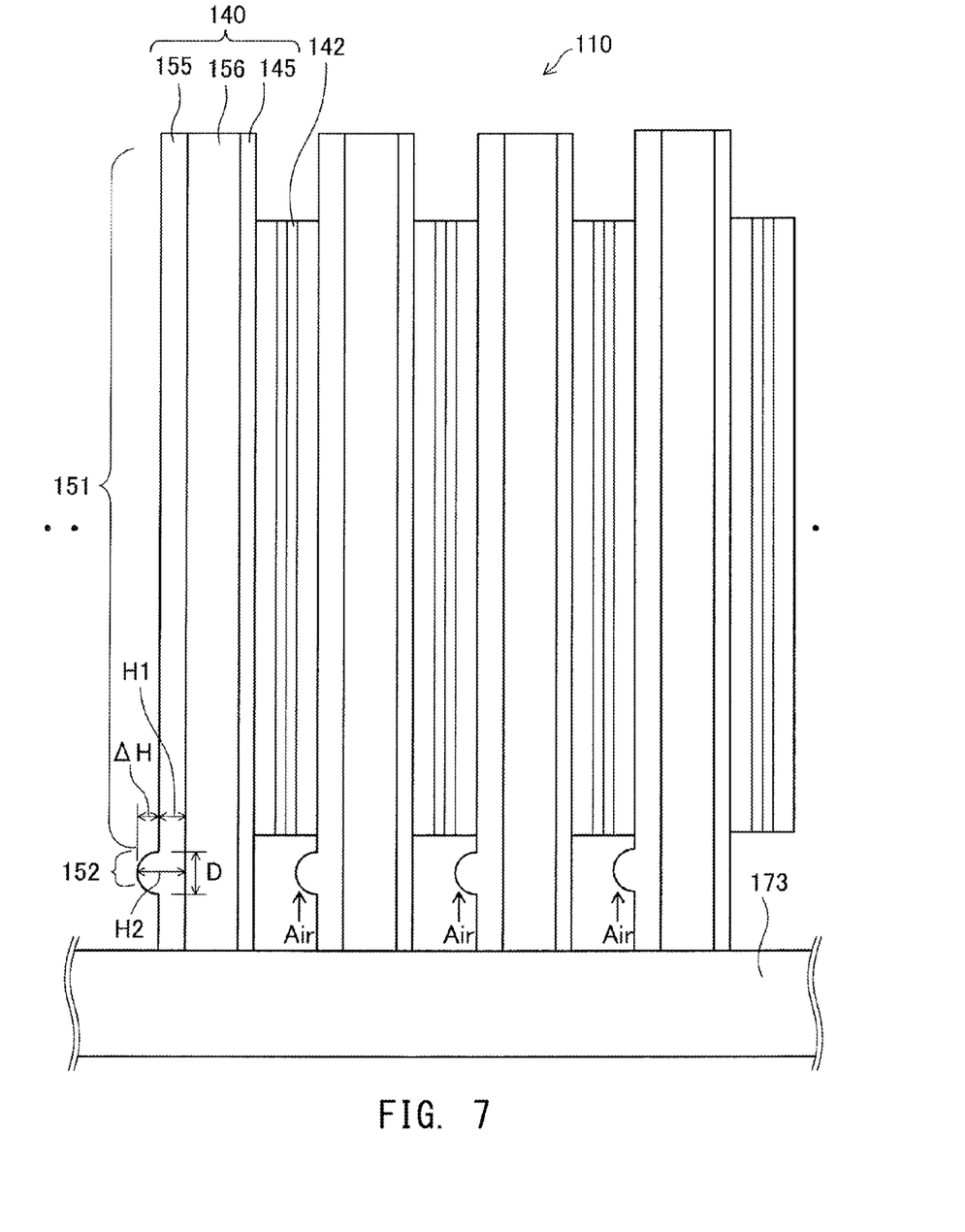
FIG. 7 Schematic view of the configuration of the solid oxide fuel cell stack 110 in second embodiment.
Figure 8:
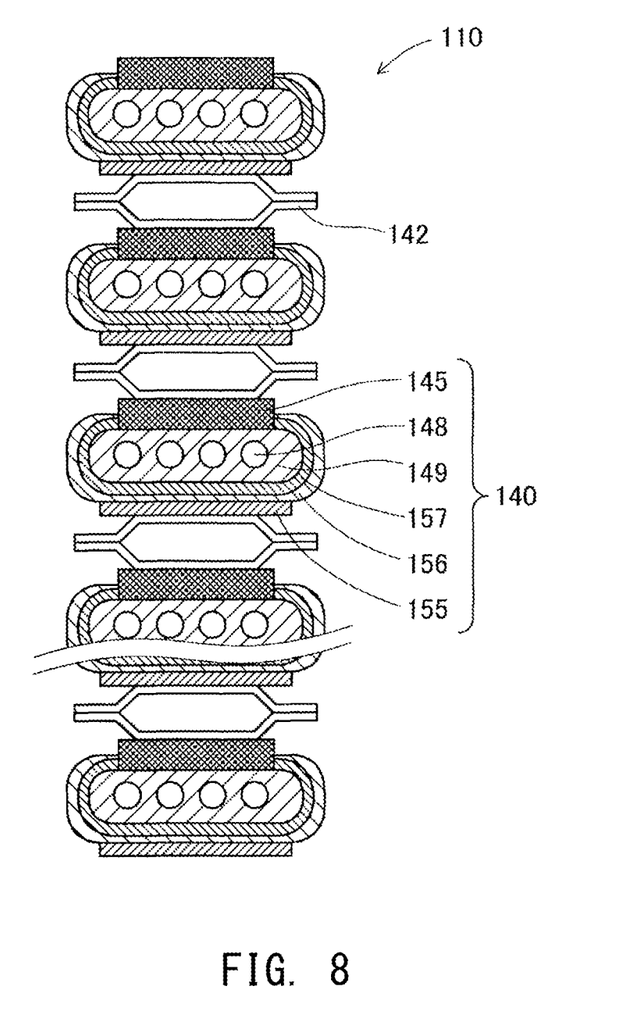
FIG. 8 Schematic view of the configuration of the solid oxide fuel cell stack 110 in second embodiment.
Figure 9:
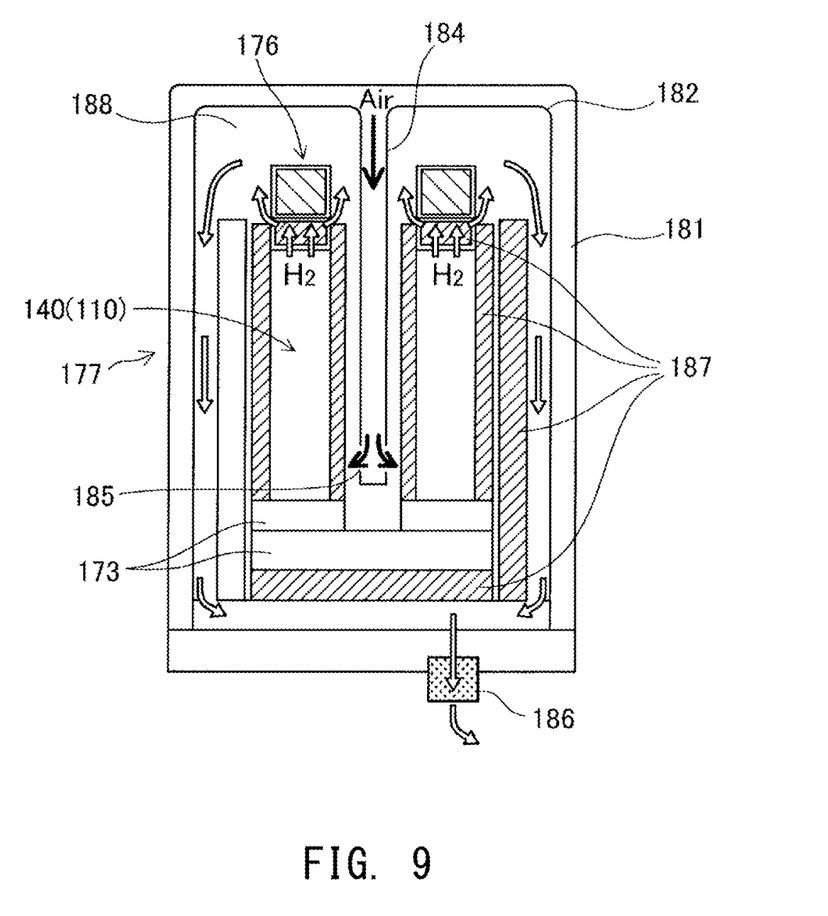
FIG. 9 Schematic view of the configuration of the solid oxide fuel cell stack 110 in second embodiment.
Figure 10:
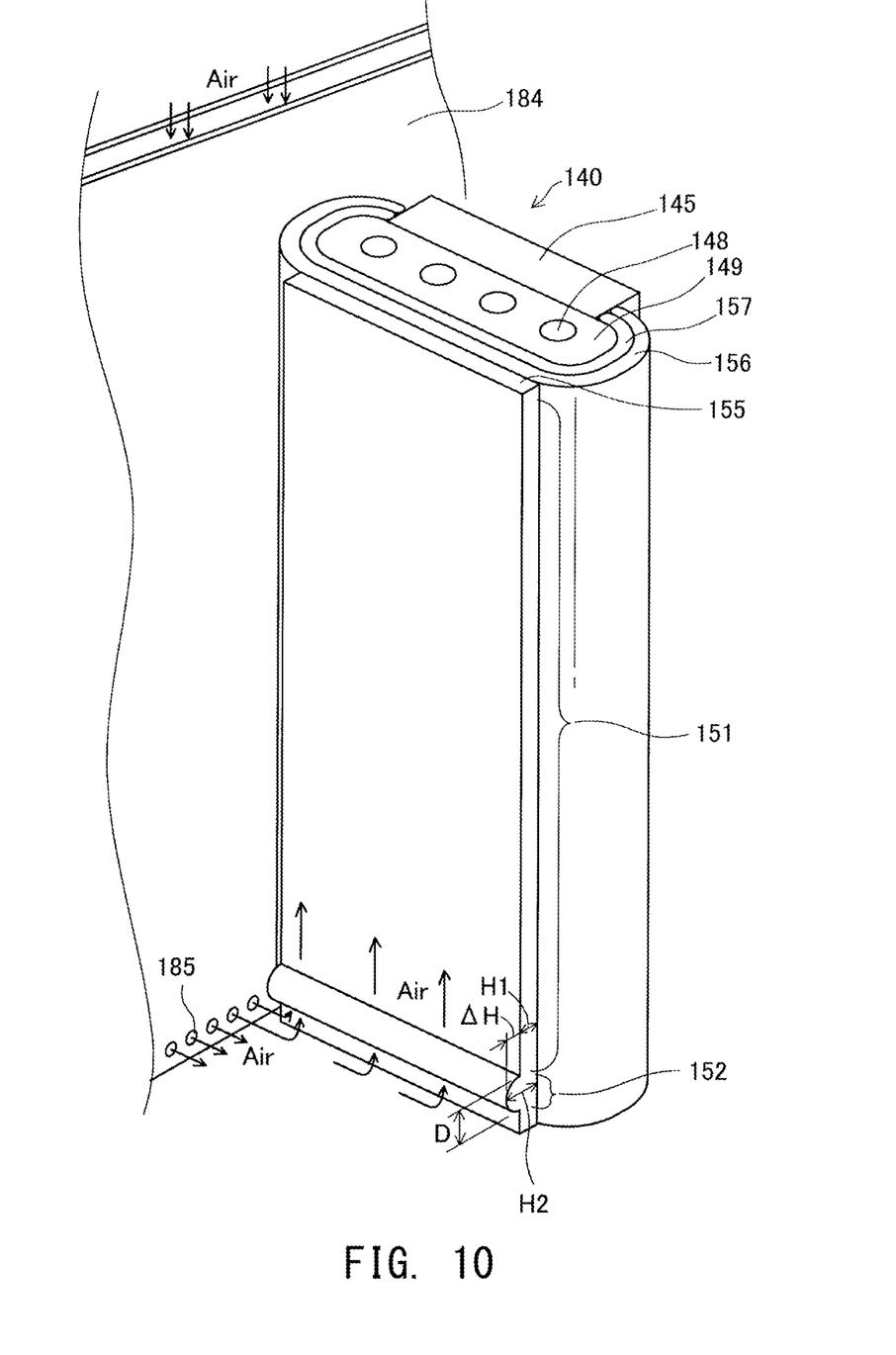
FIG. 10 Schematic view of the configuration of the solid oxide fuel cell stack 110 in second embodiment.

FIGS. 6 to 10 are schematic views of the configuration of a solid oxide fuel cell stack 110 in another or second embodiment of the present invention. FIG. 6 shows the exterior configuration of the fuel cell stack 110, and FIG. 7 shows a partial side configuration of the fuel cell stack 110. FIG. 8 shows a transverse section of the fuel cell stack 110, and FIG. 9 shows a longitudinal section of the fuel cell stack 110. FIG. 10 shows an enlarged view of one of fuel cells 140 included in the fuel cell stack 110. In the following description, structural components, materials, etc. not specifically described are the same as those in the fuel cell stack 10 in the embodiment shown in FIGS. 1 to 5.

As shown in FIGS. 6 to 8, the fuel cell stack 110 in the present embodiment includes a plurality of fuel cells 140 substantially horizontally arranged in two rows with a prescribed gap therebetween. The fuel cells 140 are electrically connected in series through current collecting members 142 disposed between adjacent fuel cells 140. The fuel cell stack 110 is contained in a container 177. FIG. 6 shows a state in which parts (front and rear faces) of the container 177 are removed and the fuel cell stack 110 contained in the container 177 is pulled out of the container 177.

As shown in FIGS. 8 and 10, each of the fuel cells 140 in the present embodiment has a substantially flattened elliptic columnar exterior shape. Each of the fuel cells 140 includes an electrode support 149, an anode 157, a solid electrolyte layer 156, a cathode 155, and an interconnector 145.

The electrode support 149 is a columnar body having a substantially elliptical cross section and is formed from a porous material. A plurality of fuel gas paths 148 extending in the extending direction of the columnar body are formed inside the electrode support 149. The anode 157 is disposed so as to cover part of the side surface of the electrode support 149, i.e., one of a pair of flat surfaces substantially parallel to each other and two curved surfaces connecting the end portions of the flat surfaces. The solid electrolyte layer 156 is disposed so as to cover the side surface of the anode 157. The cathode 155 is disposed so as to cover part of the side surface of the solid electrolyte layer 156, i.e., a portion of the side surface that is located on a flat surface of the electrode support 149. The interconnector 145 is disposed on a flat surface of the electrode support 149 on which the anode 157 and the solid electrolyte layer 156 are not disposed. Each of the current collecting members 142 described above electrically connects the cathode 155 of a fuel cell 140 to the interconnector 145 of a fuel cell 140 adjacent to the above fuel cell 140.

In the present embodiment, one of the opposite main surfaces (the outer main surface and inner main surface) of the solid electrolyte layer 156, i.e., the main surface on which the cathode 155 is disposed (the outer main surface), corresponds to a first main surface in the claims, and the main surface on which the anode 157 is disposed (the inner main surface) corresponds to a second main surface in the claims. The cathode 155 corresponds to a first electrode in the claims, and the anode 157 corresponds to a second electrode in the claims.

As shown in FIGS. 6, 7, and 9, the lower end of each of the fuel cells 140 is fixed to a manifold 173 through an insulating bonding material (not shown) such as a glass seal material. A reformer 176 for reforming fuel such as natural gas or kerosene to generate hydrogen-rich fuel gas is disposed on top of the fuel cell stack 110. The fuel gas generated in the reformer 176 is supplied to the manifold 173 through an unillustrated gas flow tube and then supplied to the fuel gas paths 148 disposed inside each of the fuel cells 140 through the manifold 173.

As shown in FIG. 9, the container 177 includes an outer wall 181 forming the outer frame of the container 177, an inner wall 182 forming a power generation chamber 188 that accommodates the fuel cell stack 110, and an oxidant gas introducing member 184 disposed between the two rows arranged in the fuel cell stack 110. Air used as the oxidant gas is supplied to the oxidant gas introducing member 184, flows downward in the oxidant gas introducing member 184, and is supplied to the power generation chamber 188 through a plurality of air ports 185 provided near the lower end of the oxidant gas introducing member 184.

When the fuel gas and the oxidant gas are supplied to each of the fuel cells 140, electric power is generated mainly in a portion in which the anode 157 and the cathode 155 face each other through the solid electrolyte layer 156. Waste gas generated during power generation in the fuel cells 140 flows through the power generation chamber 188 and is discharged from a discharge port 186 provided on the bottom of the container 177. A heat insulating material 187 for restraining a reduction in the temperature of the fuel cells 140 is appropriately disposed in the power generation chamber 188.

As shown in FIGS. 7 and 10, each cathode 155 has an inner portion 151 and an outer portion 152. The inner portion 151 is disposed in a location in which the cathode 155 is connected to a current collecting member 142. The outer portion 152 is disposed in the cathode 155 at a position outward of the current collecting member 142 and upward of the air ports 185 of the oxidant gas introducing member 184 (on the side toward to the inner portion 151). Specifically, the outer portion 152 is disposed on the oxidant gas inflow side of the cathode 155. The outer portion 152 has a shape extending substantially horizontally. The height H2 of the outer portion 152 (the height from a main surface of the solid electrolyte layer 156) is larger than the height H1 of the inner portion 151. Therefore, when the oxidant gas supplied from the air ports 185 flows upward toward the inner portion 151, poisoning substances contained in the oxidant gas are trapped by the outer portion 152 having a larger height, so that poisoning of the inner portion 151 is suppressed. Therefore, deterioration of the characteristics of the cathode 155 is suppressed, and the characteristics of the fuel cell 140 can be ensured for a long time.

As in the embodiment shown in FIGS. 1 to 5, the difference between the height H2 of the outer portion 152 and the height H1 of the inner portion 151, $\Delta H$ (=H2−H1), is preferably 10 μm or more and 200 μm or less. The width D of the outer portion 152 is preferably 0.5 mm or more and 3 mm or less, and the gap between the outer portion 152 and the interconnector 145 is preferably 0.2 mm or more.

In the embodiment shown in FIGS. 6 to 10, the overall attitude shape can be changed while the positional relations among the components are maintained.

The current collecting members in the embodiment of the present invention are conductive plate-shaped members that can prevent mixing of gas between fuel cell main bodies. However, the current collecting members are not limited to those in the present embodiment and may be other conductive members.

DESCRIPTION OF REFERENCE NUMERALS

10: solid oxide fuel cell stack
11, 12: end plate
21, 22: bolt
31, 32: through hole
35: nut
40: fuel cell
41, 45: interconnector
42a, 42b: current collecting member
43: frame unit
44: fuel cell main body
46: opening
47: oxidant gas path
48: fuel gas path
50: separator-attached fuel cell
51: cathode frame
52: insulating frame
53: metallic separator
54: anode frame
55: cathode
56: solid electrolyte layer
57: anode
58: opening 61: joint portion
62: sealing portion
110: fuel cell stack
140: fuel cell
142: current collecting member
145: interconnector
148: fuel gas path
149: electrode support
151: inner portion
152: outer portion
155: cathode
156: solid electrolyte layer
157: anode
173: manifold
176: reformer
177: container
181: outer wall
182: inner wall
184: oxidant gas introducing member
185: air port
186: discharge port
187: heat insulating material
188: power generation chamber
551: inner portion
552: outer portion

The invention claimed is:

1. A fuel battery comprising:
a fuel cell including a solid electrolyte layer having a first main surface and a second main surface, a first electrode disposed on the first main surface and serving as one of a cathode and an anode, and a second electrode disposed on the second main surface and serving as the other one of the cathode and the anode, the fuel cell generating electric power through a power generating reaction of reactant gases;
an interconnector disposed so as to face the first electrode; and
a current collecting member that electrically connects the first electrode to the interconnector;
the fuel battery being characterized in that
the first electrode includes
an inner portion connected to the current collecting member and
an outer portion disposed outward of the current collecting member and having a height larger than the height of the inner portion.

2. A fuel battery according to claim 1, further comprising:
a metallic separator joined to the fuel cell and having an opening through which the first electrode is exposed; and
a sealing portion that contains glass and seals an interface between the opening and the fuel cell.

3. A fuel battery according to claim 2, wherein
the distance between the sealing portion and the outer portion is 0.2 mm or more and 3 mm or less.

4. A fuel battery according to claim 1, wherein
the distance between the outer portion and the interconnector disposed so as to face the first electrode is 0.2 mm or more.

5. A fuel battery according to claim 1, wherein
the outer portion is disposed at least on a reactant gas inflow side of the first electrode to which one of the reactant gases is supplied.

6. A fuel battery according to claim 1, wherein
the outer portion is disposed only on a reactant gas inflow side of the first electrode to which one of the reactant gases is supplied.

7. A fuel battery according to claim 1, wherein
the outer portion is disposed over the entire circumference of the inner portion.

8. A fuel battery according to claim 1, further comprising
a second current collecting member electrically connected to the second electrode, wherein
the second electrode includes
a second inner portion connected to the second current collecting member and
a second outer portion disposed outward of the second current collecting member and having a height larger than the height of the second inner portion.

9. A fuel cell stack, characterized by comprising one or at least two fuel batteries according to claim 1.

* * * * *